United States Patent [19]

Kohno et al.

[11] Patent Number: 4,478,990
[45] Date of Patent: Oct. 23, 1984

[54] ROOM TEMPERATURE CURING ELASTIC COMPOSITION

[75] Inventors: Kiyoshi Kohno, Takatsuki; Satoshi Nishikawa, Shiga; Yoshiya Hattori, Takatsuki; Kohji Kitao, Sakai, all of Japan

[73] Assignee: Sunstar Giken Kabushiki Kaisha, Takatsuki, Japan

[21] Appl. No.: 371,989

[22] Filed: Apr. 26, 1982

[30] Foreign Application Priority Data

Apr. 28, 1981 [JP] Japan ............................ 56-64740

[51] Int. Cl.³ .................. C08F 20/12; C08F 30/08
[52] U.S. Cl. .................. 526/279; 525/326.5; 526/263; 526/264; 526/265; 526/271; 556/440; 556/482
[58] Field of Search ............ 525/326.5; 526/279, 526/263, 264, 265, 271; 556/440, 482

[56] References Cited

U.S. PATENT DOCUMENTS

| | | | |
|---|---|---|---|
| 2,983,719 | 5/1961 | Cox et al. | 526/279 |
| 3,029,225 | 4/1962 | Cox | 526/279 |
| 3,423,376 | 1/1969 | Gobran et al. | 526/279 |
| 3,453,230 | 7/1969 | Plueddemann | 526/279 |
| 3,706,697 | 12/1972 | Backderf | 526/279 |
| 4,043,953 | 8/1977 | Chang et al. | 525/326.5 |

Primary Examiner—Harry Wong, Jr.
Attorney, Agent, or Firm—Wegner & Bretschneider

[57] ABSTRACT

A room temperature curing elastic composition useful as a sealing material which comprises as a main component a polymer produced from
(a) at least one acrylic ester monomer of the formula:

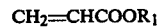

wherein $R_1$ is an alkyl having 2 to 8 carbon atoms;
(b) at least one member selected from the group consisting of vinylalkoxysilane of the formula:

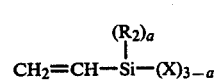

wherein $R_2$ is an alkyl having 1 to 4 carbon atoms, X is methoxy or ethoxy, and a is 0, 1 or 2; and a (meth)acryloxyalkoxysilane of the formula:

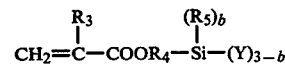

wherein $R_3$ is hydrogen or methyl, $R_4$ is a divalent hydrocarbon group, $R_5$ is an alkyl having 1 to 4 carbon atoms, Y is methoxy or ethoxy, and b is 0, 1 or 2; and
(c) a chain transfer agent having a mercapto group.

1 Claim, No Drawings

ROOM TEMPERATURE CURING ELASTIC COMPOSITION

The present invention relates to a room temperature curing elastic composition, more particularly to an elastic sealing composition which is curable with water or moisture and is useful as an elastic sealing material having excellent light resistance, weatherability, heat resistance and durability and being not expensive.

Elastic sealing materials are essential in various industries, such as civil engineering and construction industries, car industries, electrical industries, or the like and the demand therefor is increasing year by year. The elastic sealing materials are required to have not only sealing function but also function of forming a part of the constructions themselves. From this standpoint, the sealing materials are required to have excellent weatherability and durability so as to tolerate against severe natural circumstances such as wind, rain, sun light, etc. Generally, duration of the sealing materials is largely affected by variation of temperature, moisture, sun light, etc. which induce repitition of expansion and shrinkage of the sealing materials.

The conventional elastic sealing materials are compositions of various polymers such as polyurethane, polyacrylic emulsion, polysulfide polymer, silicone polymer, modified silicone polymer, or the like. Among them, a composition of silicone polymer, having as the main chain a polydimethylsiloxane chain (cf. T. Hatachi, Silicone Sealants for Building Construction, Setchaku, pp 57–62, May (1970)) has excellent durability such as light resistance, weatherability and heat resistance, and hence is particularly useful as a sealing material for burildings. However, the silicone polymer composition has some drawbacks, such as high cost, soiling of the surrouding area due to migrating of a low melecular polydimethylsiloxane thereto, and inferior adhesion with the surface coating layer. Besides, the modified silicone polymer composition containing as the main component a polyalkylene ether having hydrolyzable silyl group at the molecular terminal (cf. Japanese Patent Publication (unexamined) No. 73998/1977) is rather insufficient in light resistance and weatherability and hence must be incorporated with a large amount of an aging resistant agent (e.g. antioxidant, ultraviolet absorbing agent, etc.).

The present inventors have intensively studied to obtain an excellent improved sealing material having excellent durability such as excellent light resistance, weatherability and heat resistance comparable to the silicone polymer composition without necessity of incorporation of a large amount of an aging resistant agent, which has no problems of soiling of the surrounding area and inferior adhesion with the surface coating layer. As a result, it has been found that a specific compolymer produced by polymerizing a specific acrylic ester monomer and at least one member selected from a specific vinylalkoxysilane and methacryloxyalkoxysilane or acryloxyalkoxysilane (hereinafter, referred to as merely "(meth)acryloxyalkoxysilane") in the presence of a chain transfer agent, said copolymer having an average molecular weight of 3,000 to 100,000 and containing 1.5 to 3 alkoxysilyl groups (in average) per one molecule of the polymer, has excellent properties and is useful as a material for an elastic sealing composition.

Some copolymers having similar structure are known, for example, a copolymer of an acrylic or methacrylic ester and diallyl phthalate which contains at least one silyl group of the formula:

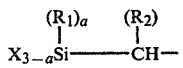

wherein $R_1$ and $R_2$ are each hydrogen, alkyl, aralkyl, or aryl, X is halogen alkoxy, etc. and a is an integer of 0 to 2, and has a molecular weight of 1,000 to 10,000 or 400 to 1,000 (cf. Japanese Patent Publication (unexamined) Nos. 40893/1979 and 122390/1979); a vinyl resin which contains at least one silyl group of the above formula and has a molecular weight of 300 to 1,000 (cf. Japanese Patent Publication (unexamined) No. 123192/1979). However, the copolymers specifically disclosed in these prior art are produced by quite different processes and are hardly used in a sealing composition.

An object of the present invention is to provide an improved elastic composition useful as a sealing material. Another object of the invention is to provide an improved sealing composition having excellent properties comparable to the conventional silicone polymer sealing composition without soiling and inferior adhesion problems thereof. These and other objects and advantages of the present invention will be apparent to those skilled in the art from the following description.

The room temperature curing elastic composition of the present invention comprises as a main component a polymer produced from (a) at least one acrylic ester monomer of the formula:

$$CH_2=CHCOOR_1$$

wherein $R_1$ is an alkyl having 2 to 8 carbon atoms;

(b) at least one member selected from the group consisting of a vinylalkoxysilane of the formula:

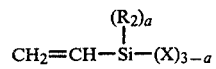

wherein $R_2$ is an alkyl having 1 to 4 carbon atoms, X is methoxy or ethoxy, and a is 0, 1 or 2, and a (meth)acryloxyalkoxysilane of the formula:

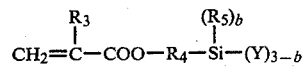

wherein $R_3$ is hydrogen or methyl, $R_4$ is a divalent hydrocarbon group, $R_5$ is an alkyl having 1 to 4 carbon atoms, Y is methoxy or ethoxy, and b is 0, 1 or 2; and (c) a chain transfer agent having a mercapto group.

The acrylic ester monomer of the formula:

$$CH_2=CHCOOR_1 \qquad [I]$$

wherein $R_1$ is an alkyl having 2 to 8 carbon atoms, to be used as the component (a) in the present invention is preferably the ester of a straight, branched or alicyclic alkyl having 2 to 8 carbon atoms such as, for example, ethyl acrylate, propyl acrylate, n-butyl acrylate, isobutyl acrylate, amyl acrylate, hexyl acrylate, 2-ethylhexyl acrylate, cyclohexyl acrylate, n-octyl acrylate or the like. These esters can be used alone or in the combination thereof. When the ester of an alkyl having one carbon atom is used, the resulting copolymer becomes hard and brittle. On the other hand, when the ester of an alkyl having 9 or more carbon atoms is used, the resulting copolymer not only has low strength but also is liable to show stickiness. Thus, the alkyl of $R_1$ should have 2 to 8 carbon atoms.

If a methacrylate ester monomer is used instead of the above acrylic ester monomer, occasionally, the resulting composition loses rubber elasticity and hence a methacrylate ester monomer is undesirable. However, other monomers including a methacrylate ester monomer which are copolymerizable with the acrylic ester monomer [I] may be used in such an amount that they do not affect the required properties of the final product, usually, 20 to 50 mole % based on the total amount of the monomer component [I]. Examples of these monomers are methacrylate esters (e.g. methyl methacrylate, ethyl methacrylate, n-butyl methacrylate, isobutyl methacrylate, 2-ethylhexyl methacrylate, lauryl methacrylate, tridecyl methacrylate, benzyl methacrylate, cyclohexyl methacrylate, tetrahydrofurfuryl methacrylate, 2-hydroxyethyl methacrylate, 2-hydroxypropyl methacrylate, glycidyl methacrylate, 2-methoxyethyl methacrylate, 2-ethoxyethyl methacrylate, etc.), acrylic esters other than the above formula [I] (e.g. methyl acrylate, glycidyl acrylate, 2-hydroxyethyl acrylate, 2-hydroxypropyl acrylate, etc.), methacrylic acid, acrylic acid, vinyl acetate, vinyl propionate, versatic acid vinyl alcohol ester (sold by Shell Chemical under the trade name of "VEOVA"), vinyl chloride, acrylonitrile, styrene, acrylamide, N-methylolacrylamide, vinylpyridine, vinylpyrrolidone, maleic anhydride, butadiene and the like.

The vinylalkoxysilane of the formula:

wherein $R_2$ is an alkyl having 1 to 4 carbon atoms, X is methoxy or ethoxy, and a is 0, 1 or 2; and the (meth)acryloxyalkoxysilane of the formula:

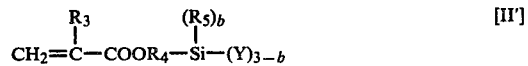

wherein $R_3$ is hydrogen or methyl, $R_4$ is a divalent hydrocarbon group, $R_5$ is an alkyl having 1 to 4 carbon atoms, Y is methoxy or ethoxy, and b is 0, 1 and 2, to be used as the component (b) in the present invention are used for the introduction of the alkoxysilyl group into the main chain of the polymer to be obtained by radical copolymerization of at least one of them with the above acrylic ester monomer [I]. The divalent hydrocarbon group for $R_4$ includes an alkylene group having 1 to 4 carbon atoms, such as methylene, ethylene, propylene, butylene. Examples of the vinylalkoxysilane [II] and the (meth)acryloxyalkoxysilane [II'] are vinyltrimethoxysilane, vinylmethyldimethoxysilane, vinyltriethoxysilane, vinyldimethylmethoxysilane, γ-methacryloxypropyl trimethoxysilane, γ-methacryloxypropyl methyl dimethoxy silane and the like. These can be used alone or in the combination thereof.

The chain transfer agent having a mercapto group to be used as the component (c) in the present invention adjusts the average molecular weight of the polymer to be obtained and its amount to be added depends upon the particular use of the polymer. Examples of the chain transfer agent are commonly employed aliphatic, aromatic and alicyclic mercaptans (e.g. n-butyl mercaptan, octyl mercaptan, lauryl mercaptan, benzyl mercaptan, cyclohexyl mercaptan, etc.) as well as mercaptoalkoxysilanes of the formula:

wherein $R_6$ is a divalent hydrocarbon group, $R_7$ is an alkyl having 1 to 4 carbon atoms, Z is methoxy or ethoxy, and c is 0, 1 or 2. The divalent hydrocarbon group for $R_6$ is selected from the same divalent hydrocarbon groups for $R_4$ as mentioned above.

The polymer to be used as the main component of the room temperature curing elastic composition of the present invention can be produced by radical copolymerization of the above components (a) and (b) in the presence of the component (c). The production can be carried out according to a known polymerization method such as a bulk or solution polymerization technique using an initiator of radical polymerization, for example, α, α'-azobisisobutyronitrile (AIBN), α, α'-azobisisovaleronitrile, benzoyl peroxide, methyl ethyl ketone peroxide or the like, or a redox polymerization technique using a redox catalyst, for example, a combination of a transition-metal salt or an amine and a peroxide initiator.

The resulting polymer is useful as a material for a sealing composition, a paint or an adhesive since it is curable at room temperature. Particularly, in case of using the polymer as a material for a sealing composition, it is preferable that the polymer has an average molecular weight of, generally, 3,000 to 100,000 and contains 1.5 to 3 alkoxysilyl groups (in average) per one molecule of the polymer. In general, the above average molecular weight can be obtained by using 0.001 to 0.05 mole, particularly, 0.002 to 0.03 mole of the chain transfer agent having a mercapto group (c) per one mole of the component (a), i.e. the acrylic ester monomer [I] (including other polymerizable monomers, if used). Further, the above content of the alkoxysilyl group in the polymer can be obtained by using the components (a) and (c) in the above molar ratio and using 0.5 to 3.0 moles of the component (b), i.e. the vinylalkoxysilane [II] or the (meth)acryloxyalkoxysilane [II'] per one mole of the component (c). Particularly, when the mercaptoalkoxysilane [III] is used as the chain transfer agent, it is preferable to use 0.5 to 2.0 moles of the vinylalkoxysilane [II] or the (meth)acryloxyalkoxysilane [II']. When a mercaptan other than the mercaptoalkoxysilane [III] is used as the chain transfer agent, it is preferable to use 1.5 to 3.0 moles of the vinylalkoxysilane [II] or the (meth) acryloxyalkoxysilane [II'].

In order to obtain a sealing composition from the resulting polymer, additives such as a plasticizer, a filler, a reinforcing agent, a thickening agent, a colorant, a modifier, a stabilizer, an adhesion promotor, a curing accelerator, a solvent and the like may added, if necessary. However, it should be noted that there is no need to use any aging resistant agent which is necessitated in a conventional elastic sealing composition (e.g. a polyurethane sealing composition, a modified silicone sealing composition, etc.) since the composition of the polymer of the present invention has excellent light resistance, weatherability, heat resistance and durability being comparable to those of a conventional silicone sealing composition, even if an aging resistant agent is not incorporated in the composition. Further, the production cost of the composition of the polymer of the present invention is fairly cheaper.

The amounts of the additives to be used will be apparent to those skilled in the art and will be choiced based on the desired properties of the particular composition.

As the plasticizer which is optionally incorporated in the composition of the present invention, there is used a phthalate ester such as dibutyl phthalate, diheptyl phthalae, di-(2-ethylhexyl) phthalate, butylbenzyl phthalate or the like; a non-aromatic dibasic acid ester such as dioctyl adipate, dioctyl sebacate or the like; a polyalkylene glycol ester such as diethylene glycol dibenzoate, triethylene glycol dibenzoate or the like; a phosphate ester such as tricresyl phosphate, tributyl phosphate or the like; a chlorinated paraffin; an alkyl diphenyl; a partially hydrogenated terphenyl; or the like, according to the desired properties of the composition to be obtained. These plasticizer can be used alone or in the combination thereof. It is possible to add the plasticizer during the production of the polymer.

The filler and the reinforcing agent are used so as to improve the properties of the curable composition (e.g. elongation, tensile strength, etc.), control the properties, reduce the cost and so on. The filler and the reinforcing agent may be those of commonly used. For example, ground calcium carbonate; presipitated calcium carbonate; surface treated calcium carbonate (treated with a fatty acid, a resin acid, a cationic surfactant, a nonionic surfactant and the like); magnesium carbonate; talc; titanium oxide, barium sulfate; alumina; metal powder such as zinc powder, iron powder and the like; bentonite; kaolin; fumed silica; ground quarts; carbon black; and the like can be used alone or in the combination thereof. It should be noted that the composition has light resistance and weatherability enough to use it in the open air, even if the filler or reinforcing agent such as fumed silica which provides transparency to the composition is used.

Examples of the thickening agent are hydrogenated caster oil derivatives; metallic soaps such as calcium stearate, aluminum stearate and barium stearate; and the like. When the filler and the reinforcing agent are incorporated in the composition, occasionally, the thickening agent can be omitted.

The colorant may be that of commonly used. For example, inorganic and organic pigments and dyes can be used. Since the polymer of the present invention is almost colorless and has excellent resistance to discoloration, a good color tone of the composition can be held for a long period of time by selecting the pigment or dye having excellent weatherability.

As the modifier, there can be used various silane coupling agents, for example, alkoxy silanes such as methyl trimethoxy silane, dimethyl dimethoxy silane, trimethyl methoxy silane, n-propyl trimethoxy silane and the like; alkyl isopropenoxy silanes such as dimethyl diisopropenoxy silane, methyl triisopropenoxy silane, $\gamma$-glycidoxypropyl methyl diisopropenoxy silane and the like; alkoxy silanes having functional groups such as $\gamma$-glycidoxypropyl methyl dimethoxy silane, $\gamma$-glycidoxypropyl trimethoxy silane, vinyl trimethoxy silane, vinyl dimethyl methoxy silane, $\gamma$-aminopropyl trimethoxy silane, N-($\beta$-aminoethyl)aminopropyl methyl dimethoxy silane, $\gamma$-mercaptopropyl trimethoxy silane, $\gamma$-mercaptopropyl methyl dimethoxy silane and the like. The more the number of the alkoxy groups which bond to the silicon atom of the alkoxysilane is, the more the silane tends to increase hardness. In general, the modifier shows sufficient effect in an amount of 5 parts by weight or less per 100 parts by weight of the polymer used as a material for the sealing composition.

Although the stabilizer is not always needed if moisture in the curable composition is removed, a lower alcohol such as methanol, ethanol or the like; or various alkoxysilane coupling agents may be used as the stabilizer in an amount of 10 parts by weight or less per 100 parts by weights of the polymer.

If the polymer of the present invention itself has adhesion to glass, ceramic materials, metals and the like, or if various primers are applied, the composition of the present invention can be bonded to various kinds of materials, and hence the adhesion promotor is not always needed. However, when one or more adhesion promotors such as various silane coupling agents, alkyl titanates, aromatic polyisocyanates and the like are used, adhesion of the composition to wide variety of materials can be improved.

As the curing accelerator, if necessary, there can be used titanates such as tetrabutyl titanate, tetrapropyl titanate and the like; organic tin compounds such as dibutyltin dilaurate, dibutyltin maleate, dibutyltin diacetate, stannous octoate, stannous naphthenate and the like; lead octoate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylamino methyl)-phenol, morpholine, N-methylmorpholine, 1,3-diazabicyclo(5,4,6)undecene-7 (DBU), salts thereof (e.g. carboxylates thereof, etc.) and the like; low molecular weight polyamide resins prepared from polyamines (excess amount) and polybasic acids; reaction products of polyamines (excess amount) and epoxy compounds; silane coupling agents having amino groups (e.g. $\gamma$-aminopropyl trimethoxy silane, N-($\beta$-aminoethyl)aminopropylmethyl dimethoxy silane, etc.); and the like. These curing accelerators can be used alone or in the combination thereof.

In order to improve workability and lower viscosity, a solvent may be incorporated in the composition of the present invention. For example, an aromatic hydrocarbon solvent such as toluene, xylene or the like; and an ester solvent such as ethyl acetate, butyl acetate, cellosolve acetate or the like; or a ketone solvent such as methyl ethyl ketone, methyl isobutyl ketone, diisobutyl ketone or the like can be used. It is possible to add the solvent during the production of the polymer.

Although no aging resistant agent is needed in the composition of the present invention, a common antioxidant and a common ultraviolet absorbing agent may be incorporated in the composition.

The sealing composition of the present invention can be prepared in the form of a one-component system wherein all the ingredients are previously admixed to give the desired composition which is stored in a sealed container and, after application, is cured by moisture in the atmosphere; or in the form of a two-component system wherein the ingredients such as the curing catalyst, the filler, the plasticizer and water are separately admixed to give a curing agent mixture and, upon application, the mixture is admixed with a separately prepared main composition of the polymer.

In case of a one-component system, since all the ingredients are incorporated in the composition, it is preferable to previously dehydrate or dry the ingredients containing water or to dehydrate the mixture of the ingredients, for example, under a reduced pressure during mixing thereof.

In case of a two-component system, since the main composition does not contain the curing catalyst, gelation of the main composition can be fairly inhibited. However, where long-term storage stability is desired, it is preferable to dehydrate or dry the main composition.

Dehydration or drying is preferably carried out by heat drying in case of the composition in a solid form such as powder, by dehydration under a reduced pressure in case of the composition in a liquid form, or by dehydration using a synthetic zeolite, active alumina, silica gel and the like. Further, dehydration can be also carried out by adding a small amount of a isocyanate compound to react the isocyanate group thereof with water. In addition to these dehydration or drying techniques, storage stability can be further improved by addition of a lower alcohol such as methanol ethanol or the like; or an alkoxysilane compound such as n-propyltrimethoxysilane, vinylmethyldimethoxysilane, γ-mercaptopropylmethyldimethoxysilane, γ-glycidoxypropyltrimethoxysilane or the like.

The following examples further illustrate the present invention in detail but are not construed to limit the scope thereof.

EXAMPLE 1

(a) n-Butyl acrylate 128 g (1 mole), vinyltrimethoxysilane 0.74 g (0.005 mole) and γ-mercaptopropylmethyldimethoxysilane 1.44 g (0.008 mole) were mixed. To the mixture was added α, α'-azobisisobutyronitrile 0.3 g and stirred to give a solution. 30 g Portion of the solution was placed in a 300 ml four-necked separable flask equipped with a stirrer and replaced with dry nitrogen gas and slowly heated in an oil bath (80° C.) under nitrogen atmosphere. A few minutes later, polymerization was initiated and an exothermic reaction was taken place. The exothermic reaction became gentle and viscosity increase was observed. Stirring and heating were continued. After about 10 minutes, the remaining solution was slowly added dropwise over about 3 hours to the reaction mixture to proceed polymerization. After completion of addition, heating was continued for about 30 minutes. α, α'-Azobisisobutyronitrile 0.1 g was added and heating and stirring were further continued for about 1 hour to complete polymerization. The polymer thus obtained was colorless viscous liquid having viscosity of 1,450 poise at 20° C., polymerization rate of 99% (measured by weight loss at 110° C. for 3 hours (nonvolatile matter method)), and average molecular weight of 15,400 (measured by equilibrium of vapor pressure).

(b) Rutile titanium dioxide 10 g, surface treated calcium carbonate (treated with a fatty acid) 90 g, toluene 10 g and methanol 2 g were admixed with the above-obtained polymer 100 g and the mixture was homogeneously kneaded with a three-rool mill and deaerated under reduced pressure in a vacuum mixer for 5 minutes to give a non sag white paste composition.

Dibutyltin dilaurate 0.2 g and n-octylamine 0.4 g were added to the paste composition and the composition was throughtly mixed under a reduced pressure with preventing inclusion of air bubbles. The composition was spreaded on a polyethylene plate in a sheet of about 2.5 mm thick. The sheet was allowed to cure at 20° C. under 65 % RH for 7 days to obtain a cured sheet having rubber elasticity.

EXAMPLES 2 to 6

(a) According to the same procedure as in Example 1, polymers were prepared by using the ingredients shown in Table 1 hereinafter. Viscosities, polymerization rate and average molecular weights of the polymers thus obtained are also shown in Table 1.

In Table 1, the abbreviations mean as follows:
BA: Butyl acrylate;
EA: Ethyl acrylate;
2EHA: 2-Ethylhexyl acrylate;
VAc: Vinyl acetate;
MCDMS: γ-Methacryloxypropyl methyl dimethoxy silane;
MCTMS: γ-Methacryloxypropyl trimethoxy silane;
VDMS: vinyl methyl dimethoxy silane;
MRDMS: γ-Mercaptopropyl methyl dimethoxy silane;
MRTMS: γ-Mercaptopropyl trimethoxy silane;
LM: Lauryl mercaptane;
AIBN: α, α'-Azobisisobutyronitrile; and
DOP: Di(2-ethylhexyl)phthalate.

In the polymerization rate, *1 was measured by weight loss at 110° C. for 3 hours and *2 was measured by weight loss in n-hexane extraction.

In the average molecular weights, *3 was measured by equilibrium of vapor pressure and *4 was calculated by subtracting DOP value from the value of *3.

Viscosities were measured at 20° C. by using a Brookfield type viscometer.

TABLE 1

|  | Example 2 | Example 3 | Example 4 | Example 5 | Example 6 |
|---|---|---|---|---|---|
| BA | 128 g (1) | — | — | 90 g (0.7) | 128 g (1) |
| EA | — | 100 g (1) | — | — | — |
| 2EHA | — | — | 184 g (1) | — | — |
| VAc | — | — | — | 26 g (0.3) | — |
| MCDMS | 3.49 g (0.015) | — | — | 0.46 g (0.002) | 1.16 g (0.005) |
| MCTMS | — | — | 1.99 g (0.008) | — | — |
| VDMS | — | 0.40 g (0.003) | — | — | — |
| MRDMS | 2.70 g (0.015) | 0.72 g (0.004) | 1.44 g (0.008) | — | — |
| MRTMS | — | — | — | 0.98 g (0.005) | — |
| LM | — | — | — | — | 0.51 g (0.0025) |
| AIBN | 0.3 + 0.1 g | 0.3 + 0.1 g | 0.3 + 0.1 g | 0.3 + 0.1 g | 0.3 + 0.1 g |
| DOP | — | 25 g | — | 30 g | 32 g |
| Viscosity (P) | 840 | 3,200 | 1,540 | 750 | 2,300 |
| Polymerization rate (%) | 98.6*1 | 98.2*1 | 98.7*2 | 97.2*1 | 99.1*1 |
| Average molecu- | 8,450*3 | 24,300*4 | 23,000*3 | 21,500*4 | 49,500*4 |

TABLE 1-continued

|  | Example 2 | Example 3 | Example 4 | Example 5 | Example 6 |
|---|---|---|---|---|---|
| lar weight | | | | | |

The number in parenthesis means mole.

(b) According to the same procedure as in Example 1, cured sheets having rubber elasticity were prepared by using the polymers shown in Table 1.

Test 1

(a) According to the method of JIS K-6301, degree of elongation (%) and breaking strength (kg·f/cm$^2$) at rate of pulling of 500 mm/min. of each sheets obtained in Examples 1 to 6 were measured by using the No. 3 dumbell specified in JIS K-6301 and an autograph (Autograph DSS-2000 Type manufactured by Shimazu Seisaku-sho, Japan). The results are shown in Table 2 hereinafter.

(b) In order to evaluate light resistance and weatherability, the dumbbell specimens used in the above (a) were exposed to a sunshine type weatherometer (WEL-SUN-HCH Type manufactured by Suga Shikenki, Japan, rainfall cycle: 12 min./120 min.) for 1,000 hours and then degree of elongation and breaking strength of each specimens were measured as in the above (a). The results are also shown in Table 2.

(c) Further, in order to evaluate heat resistance, specimens of each sheets of Examples 1 to 6 were allowed to stand in an incubator maintained at 100° C. for 14 days and then degree of elongation and breaking strength thereof were measured as in the above (a). The results are also shown in Table 2.

For comparison, the results obtained by testing a commercially available two-component system polyurethane elastic sealing composition (Control 1) and a commercially available two-component system silicone elastic sealing composition (Control 2) as in the above (a) to (c) are also shown in Table 2.

sitions obtained in Examples 1 to 6 were applied on the primer layer of the glass plate and allowed to cure at 20° C. under 65% RH for 7 days. The glass plate was exposed to a sunshine type weatherometer for 1,000 hours under such a condition that the opposite uncoated surface of the glass plate was irradiated with light. Adhesion between the composition layer and the surface of the glass plate was examined by cutting with a knife. However, peeling (adhesive failure) of the composition layer was not observed at all, which showed that adhesion was very good.

For comparison, the same test was repeated by using a commercially available two-component system silicone sealing composition, a commercially available one-component system polyurethane sealing composition and a commercially available two-component system modified silicone sealing composition. However, adhesive failure was observed after exposure only for 100 hours in case of the polyurethane sealing composition and only for 150 hours in case of the modified silicone sealing composition. In the silicone sealing composition, no degradation and adhesive failure at the interface between glass and the composition were observed after exposure for 1,000 hours.

Therefore, it is apparent that the sealing composition of the present invention can be used for sealing or adhesion of glasses in various fields even without a black primer for screening light and give strong adhesion for a long period of time.

Test 3 (Adhesion to coatings)

The composition obtained in Example 1 was applied on a glass plate in about 2 mm thick and allowed to cure

TABLE 2

|  |  | Ex. 1 | Ex. 2 | Ex. 3 | Ex. 4 | Ex. 5 | Ex. 6 | Control 1 | Control 2 |
|---|---|---|---|---|---|---|---|---|---|
| After curing at 20° C. for 7 days | Ultimate elongation (%) | 420 | 350 | 760 | 330 | 320 | 430 | 830 | 1020 |
|  | Breaking strength (kg · f/cm$^2$) | 5.5 | 5.2 | 4.6 | 4.0 | 5.3 | 7.5 | 21.3 | 11.6 |
| After exposure to weatherometer for 1,000 hours | Appearance | No change | No change | No change | No change | No change | No change | Remarkable chalking, many cracking | No change |
|  | Ultimate elongation (%) | 390 (92.8) | 340 (97.1) | 690 (90.8) | 340 (103.0) | 310 (96.9) | 440 (102.3) | 340 (41) | 980 (96.1) |
|  | Breaking strength (kg · f/cm$^2$) | 5.8 (105.5) | 5.2 (100) | 5.3 (115.2) | 4.2 (105) | 5.4 (101.9) | 7.9 (105.3) | 5.3 (25) | 12.5 (107.8) |
| After 14 days at 100° C. | Degree of elongation (%) | 390 (92.9) | 360 (102.9) | 680 (89.5) | 330 (100) | 330 (103.1) | 420 (97.7) | Softened, unmeasured | 98.0 (96.1) |
|  | Breaking Strength (kg · f/cm$^2$) | 6.1 (110.9) | 5.5 (105.8) | 4.9 (106.5) | 4.2 (105.0) | 5.3 (100) | 7.8 (104.0) | Softened unmeasured | 12.2 (105.2) |

The number in parenthesis means retention (%)

Test 2

Primer KBP-41 (transparent organic silane primer manufactured by Shinetsu Kagaku Kogyo Kabushiki Kaisha, Japan) was thinly applied on a surface of glass plate having 5 mm in thickness and dried. Each compoat 20° C. under 65% RH for 7 days. An aqueous acrylic paint for a wall coated with sand (Daiya Ep Rishin manufactured by Kowa Kagaku Kogyo Kabushiki Kaisha, Japan) was spary-coated and dired at 20° C. under 65% RH for 1 day. A commercially available pressuresensitive adhesive cellophane tape was pressed on the coated surface and then quickly peeled off. However, peeling of the coating layer was not observed at all, which showed that adhesion to coating was very good. When the same test was repeated by using a commercially available two-component system silicone sealing composition, the coating was completely peeled off from the surface of the sealing composition layer, which showed that adhesion to coating was very bad.

Test 4 (Staining)

The composition obtained in Example 1 was filled in a masonry joint of granite and allowed to cure at 20° C. under 65% RH for 7 days. After peeling off masking tapes, it was allowed to stand for 3 months in the open air to expose to the weather. After simply washing with water to remove dust and drying, straining of granite around the joint was examined. However, no staining was observed at all. When the same test was repeated by using a commercially available two-component system silicone sealing composition, the surrounding area of the joint was darkened. Upon washing with water, the both sides of the joint showed water repellency in the width of 2 to 3 cm and color thereof was changed as if stained with oil. This staining was apparently caused by the sealing composition.

What is claimed is:

1. A room temperature curing elastic sealant composition which comprises as a main component a liquid polymer produced by the free-radical polymerization of
   (a) one mole of at least one acrylic ester monomer of the formula:

$$CH_2=CHCOOR_1 \quad [I]$$

wherein $R_1$ is alkyl having 2 to 8 carbon atoms; with
   (b) at least one member selected from the group consisting of a vinylalkoxysilane of the formula:

$$CH_2=CH-\underset{\underset{(R_2)_a}{|}}{Si}-(X)_{3-a} \quad [II]$$

wherein $R_2$ is methyl, X is methoxy or ethoxy, and a is 0 or 1, and a methacryloxyalkoxysilane of the formula:

$$CH_2=\underset{\underset{R_3}{|}}{C}-COOR_4-\underset{\underset{(R_5)_b}{|}}{Si}-(Y)_{3-b} \quad [II']$$

wherein $R_3$ is hydrogen or methyl, $R_4$ is ethylene or propylene, $R_5$ is methyl, Y is methoxy or ethoxy, and b is 0 or 1, in the pressence of
   (c) 0.002 to 0.03 mole of a chain transfer agent having a mercapto group selected from the group consisting of n-butyl mercaptan, octyl mercaptan, lauryl mercaptan, benzyl mercaptan, cyclohexyl mercaptan and a mercaptoalkoxysilane of the formula:

$$HS-R_6-\underset{\underset{(R_7)_c}{|}}{Si}-(z)_{3-c} \quad [III]$$

wherein $R_6$ is ethylene or propylene, $R_7$ is methyl, z is methoxy or ethoxy, and c is 0 or 1;
   said component (b) being used in an amount of 0.5 to 2.0 moles per mole of component (c) when component (c) is a mercaptalkoxysilane of the formula [III], or in an amount of 1.5 to 3.0 moles per mole of component (c) when component (c) is a mercaptan compound other than the mercaptoalkoxysilane of the formula [III];
   said liquid polymer having an average molecular weight of 3,000 to 100,000 and containing 1.5 to 3 alkoxysilyl groups per molecule of polymer.

* * * * *